June 20, 1944.  D. T. BROWN ET AL  2,352,074
AIRCRAFT
Filed Oct. 4, 1941
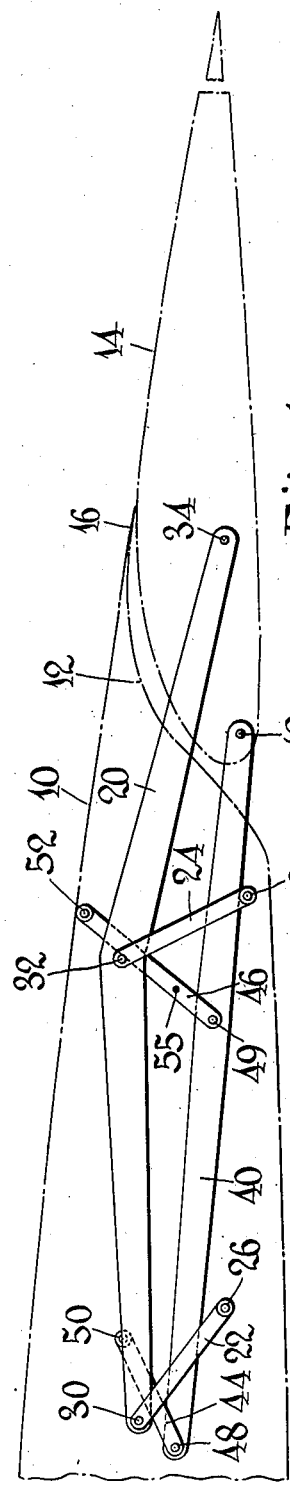
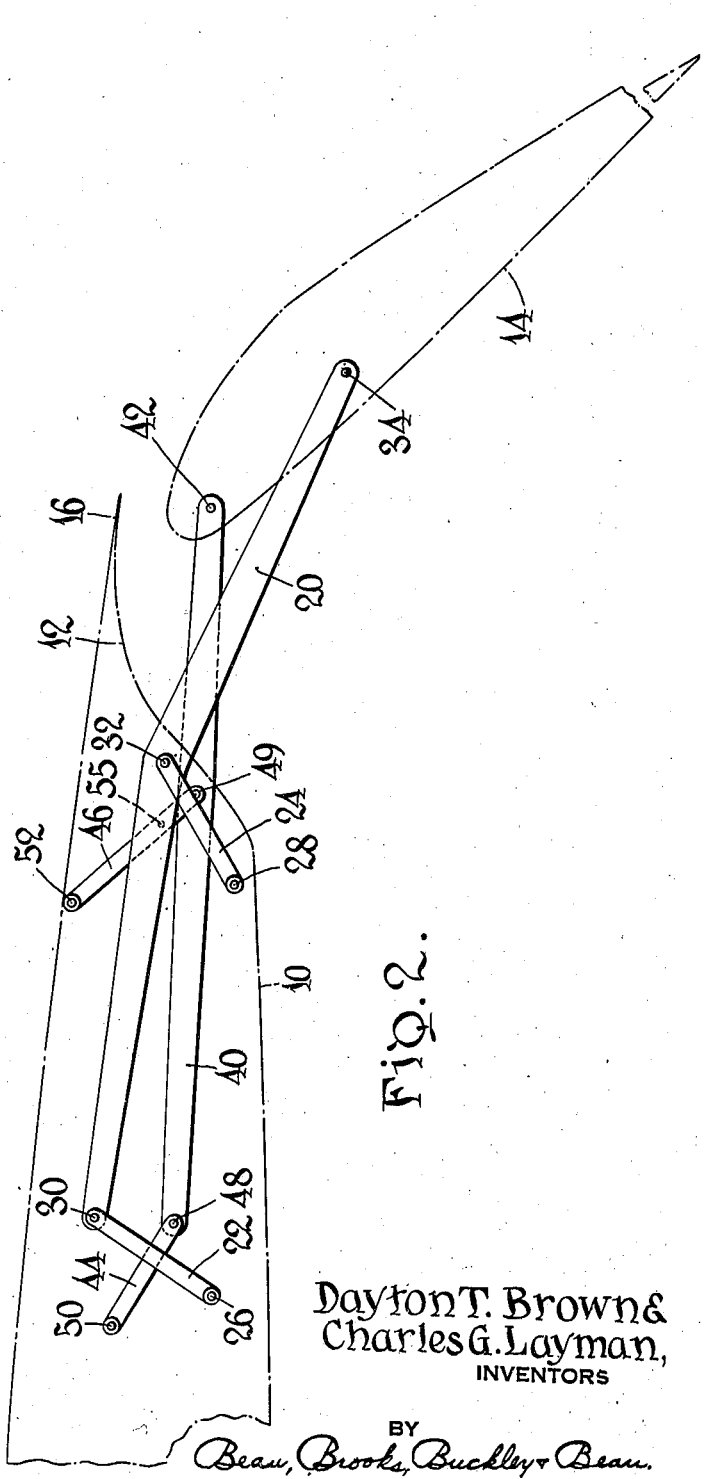
Dayton T. Brown &
Charles G. Layman,
INVENTORS
BY
Beau, Brooks, Buckley & Beau.
ATTORNEYS Patented June 20, 1944

2,352,074

UNITED STATES PATENT OFFICE 2,352,074

AIRCRAFT

Dayton T. Brown, Manhasset, N. Y., and Charles G. Layman, Red Bank, N. J., assignors to Brewster Aeronautical Corporation, Long Island City, N. Y.

Application October 4, 1941, Serial No. 413,638

9 Claims. (Cl. 244—42)

This invention relates to aircraft, and more particularly to improvements in air foils of the slot-flap type, and to improved means for supporting a trailing edge flap of the slot providing type relative to an airplane wing in conjunction with heavy duty military airplanes, or the like.

One of the objects of the invention is to provide an improved means for supporting and actuating a trailing edge flap member relative to a main wing member. Another object of the invention is to provide means of the character described which are particularly suited to provide an improved heavy duty military airplane of the dive bombing type, or the like. More specifically, another object of the invention is to provide a novel supporting and actuating mechanism for trailing edge flap members whereby the flap members are adapted to be actuated between normal and deflected portions and between slot-closed and slot-open positions in improved manner. Another object of the invention is to provide a chord-wise displaceable flap supporting mechanism which is of improved strength and ruggedness and is completely nested within the wing-flap contour throughout all phases of flap adjustment. Other objects and advantages of the invention will appear from the specification hereinafter.

In the drawing:

Fig. 1 is a chord-wise sectional view of a wing fragment and a trailing edge flap mounted thereon by means of mechanism of the invention, with the flap shown in normal slot-closed position; and Fig. 2 is a view corresponding to Fig. 1 showing the flap and supporting-actuating mechanism in flap-deflected and slot-open position.

The invention is illustrated in connection with an airplane wing panel 10 which is recessed as at 12 adjacent its rear edge to accommodate the leading edge portion of a trailing edge type flap 14 in nested relation thereunder when the flap is in normal flight position as illustrated by Fig. 1. It will be noted that the wing 10 terminates rearwardly in a knife-edge formation at 16 which is so shaped as to complement and cooperate with the adjacent curved upper surface portion of the flap 14 so as to provide a substantially smooth and continuous air foil upper surface formation throughout the chord-wise extent of the wing and flap combination. Thus, when the flap is in this position of adjustment there is no appreciable air slot opening through the combination air foil upper surface between the main wing and the flap.

The flap 14 is supported and carried from the main wing 10 by means of a series of cantilever arms 20 which are disposed substantially chord-wise of the wing and within the contour thereof and spaced at intervals span-wise of the wing and adjustably mounted thereon by means of transversely disposed paired front and rear pivot links 22—24, respectively. The pivot links 22 are mounted by means of pivot pins 26 to fixed portions of the main wing 10 at firmly braced sections thereof, and the pivot links 24 are similarly mounted by means of pins 28 to the main wing structure at firmly braced sections thereof. At their upper ends the pivot links 22—24 are pivotally connected by means of pins 30—32 to the corresponding cantilever arms 20.

The flap 14 is arranged to be carried on the extending outer end portions of the cantilever arms 20 through pivotal connections therewith by means of pins 34; and the pivotal connections between the cantilever arms 20 and the flap 14 are arranged to be disposed approximately at the normal region of the resultant of airstream forces acting upon the flap. Thus, it will be understood that the flap 14 is carried at substantially its center aerodynamic balance by means of a series of stiff cantilever arms which extend substantial distances into the interior of the main wing 10 for pivotal connections thereto at relatively widely spaced positions, whereby extremely firm mountings of the cantilever arms upon the main wing are provided through mechanism which is compacted entirely within the streamline form of the combination wing-flap air foil. The pivot links 22—24 are longitudinally dimensioned and so connected to the main wing and the corresponding cantilever arms 20 as to cause the outer end portions 34 of the cantilever arms to move in relatively flat arcuate paths directed rearwardly and downwardly from the position of Fig. 1 to the position of Fig. 2 in response to rearwardly directed forces imposed upon the link-lever arm system, so as to provide the open slot effect between the wing panel 10 and the flap 14 illustrated by Fig. 2.

To automatically regulate the attitude of the flap 14 to different positions of angular deflection relative to the main wing in conjunction with forwardly and rearwardly displacement movements thereof, a second series of lever arms 40 are pivotally connected at their outer end portions by means of pivot pins 42 to the flap 14 and are arranged at intervals span-wise of the wing structure to substantially correspond to the span-wise locations of the cantilever arms 20. The levers 40 connect to the flap 14 interiorly thereof in the region of the leading edge portion thereof, and are so arranged as to extend inwardly of the main wing structure for pivotal connections thereto at spaced positions in the regions of the pivotal connections 26—28 of the cantilever arms 20. Thus, each lever 20 is pivotally connected to the main wing 10 by means of paired pivot links 44—46 through suitable pin connections 48 and 49, and the links 44—46 are pivotally connected to the main wing as at 50 and 52, respectively. The links 44—46 are so longitudinally dimensioned and pivotally connected to the corresponding levers 40 as to provide for movement of the outer end portions of the levers in relatively flat arcuate paths rearwardly and upwardly in response to rearwardly directed forces acting upon the lever-link system. Thus, the flap supporting arm and link mechanisms comprise a pair of oppositely based "four-bar linkage" systems.

Thus, in response to rearwardly directed forces acting upon any portion of the flap or link or lever or cantilever elements of the mechanism the flap will be adapted to move from the position of Fig. 1 toward the position of Fig. 2; and in connection with such movement the flap 14 will be at all times positively guided and supported relative to the main wing in predetermined relatively deflected attitudes and displaced positions as shown by way of example by the drawing. It is of course contemplated that any suitable type of pilot-controlled force device may be operatively connected to the link-lever-cantilever mechanism, as indicated diagrammatically at 55, for example, to procure motivation of the flap 14 between flap-normal slot-closed or flap-deflected slot-open positions to furnish the required open slot effect for high-lift high-drag performance, as in connection with landing or dive bombing maneuvers or the like. Preferably, the force device will comprise a mechanism disposed entirely within the wing cell and having a force-delivering strut member disposed so as to direct its forces substantially parallel to the chordal plane thereof. For example, the force device may comprise a hydraulic jack or other extending strut type mechanism disposed chordwise of the wing and substantially parallel to the chordal plane thereof, whereby the control forces will be applied to the flap-link system most effectively and substantially in the direction of motion of the flap supporting lever members while the entire flap actuating gear remains nested within the wing contour throughout all phases of the flap movement.

Thus, it will be appreciated that another particular feature and advantage of the invention resides in the fact that the particular form and arrangement of the invention of the cantilever and lever arm and link mountings therefor provides a mechanism which is peculiarly suited to provide relatively great chord-wise displacements of the flap relative to the wing by means of a simple and rugged pivoting and control mechanism which is adapted to be completely nested within a vertically narrow airfoil contour throughout all phases of the flap adjustment. Also, it will be understood that although only one form of the invention has been shown and described in detail, various changes may be made therein without departing from the spirit of the invention and the scope of the appended claims.

We claim:

1. In an airplane, a wing and a relatively movable flap therefor, a pair of flap supporting levers pivotally connected at their outer ends directly to said flap at points spaced in a vertical chordwise plane, and a pair of links associated with each of said levers for supporting the same for body movement thereof in predetermined paths, each pair of links having an end of each link thereof pivotally attached to said wing and the opposite end thereof pivotally attached to the corresponding of said levers, the links of each pair thereof being spaced in the direction of the length of its associated lever.

2. In an airplane, a wing and a movable flap therefor, a pair of flap supporting levers pivotally connected at their outer ends directly to said flap at points spaced in a vertical chordwise plane, and a pair of links associated with each of said levers for supporting the same for body movement in a predetermined path, each pair of links having an end of each link pivotally attached to said wing and the opposite end thereof pivotally attached to the corresponding one of said levers, the links of each pair being spaced in the direction of the length of its associated lever, the links of one lever extending therefrom generally upwardly and the links of the other of said levers extending therefrom generally downwardly.

3. In an airplane, a wing and a movable flap therefor, upper and lower flap supporting and positioning levers extending generally chordwise of said wing and pivotally connected at their outer ends directly to said flap at points spaced chord-wise of said flap in a vertical chordwise plane thereof, and a pair of links associated with each of said levers for supporting the same for body movement in a predetermined path, each pair of links having an end of each link pivotally attached to said wing and the opposite end thereof pivotally attached to said lever, the links of each pair being spaced in the direction of the length of its associated lever.

4. In an airplane, a wing and a movable flap therefor, upper and lower flap supporting and positioning levers extending generally chordwise of said wing and pivotally connected at their outer ends to said flap at points spaced in a vertical chordwise plane, and a pair of links associated with each of said levers for supporting the same for body movement in a predetermined path, each pair of links having an end of each link pivotally attached to said wing and the opposite end thereof pivotally attached to said lever, the links of each pair being spaced in the direction of the length of its associated lever, the links of the upper lever extending downwardly therefrom and the links of the lower lever extending upwardly therefrom.

5. In an airplane, a wing, a flight control flap adjacent said wing, and flap support means interconnecting said wing and said flap, said support means comprising a pair of arms, a pair of relatively spaced links for supporting each of said arms relative to said wing, said links being pivotally mounted upon said wing and pivotally connected to the corresponding of said arms for supporting the latter in cantilever manner to extend from said wing, said arms being pivotally connected at their extending portions to said flap at positions thereon spaced in the chordwise direction of said flap, whereby both of said arms are guided to move bodily in the same generally longitudinal direction but in oppositely curving paths in connection with extension-retraction and tilting movements of said flap relative to said wing.

6. In an airplane, a wing, a flight control flap adjacent said wing, and flap support means interconnecting said wing and said flap, said support means comprising a pair of arms, a pair of relatively spaced links for supporting each of said arms relative to said wing, said links being pivotally mounted upon said wing and pivotally connected to the corresponding of said arms for supporting the latter in cantilever manner to extend from said wing, said arms being pivotally connected at their extending portions to said flap at positions thereon spaced in the chordwise direction of said flap, whereby said arms are simultaneously movable bodily relative to said wing in directions having like horizontal components but opposite vertical components in connection with extension-retraction and tilting movements of said flap relative to said wing.

7. In an airplane, a wing, a flight control flap adjacent said wing, and flap support means interconnecting said wing and said flap, said support means comprising a pair of four-bar link structures based upon said wing and separately connected pivotally to said flap at positions thereon spaced in the chordwise direction of said flap, whereby said flap is guided to move bodily relative to said wing with simultaneous extension or retraction and tilting movements.

8. In an airplane, a wing, a flight control flap adjacent said wing, and support means interconnecting said wing and said flap, said support means comprising a pair of arms, a pair of relatively spaced links for supporting each of said arms relative to said wing, said links being pivotally mounted upon said wing and pivotally connected to the corresponding of said arms for supporting the latter to extend from said wing in cantilever manner, said arms being pivotally connected at their extending portions to said flap at positions thereon spaced in a chordwise direction of said flap, said links and arms being so arranged that said arms are guided to move bodily in paths having similarly directed horizontal components and oppositely directed vertical components.

9. In an airplane, a wing, a flight control flap adjacent said wing, and flap support means interconnecting said wing and said flap, said support means comprising two separate quadrilateral link means based upon said wing and pivotally connected at moving portions thereof to said flap at positions thereon spaced in the chordwise direction of said flap.

DAYTON T. BROWN.
CHARLES G. LAYMAN.